(12) United States Patent
Shin et al.

(10) Patent No.: US 8,792,061 B2
(45) Date of Patent: Jul. 29, 2014

(54) LIQUID CRYSTAL DISPLAY DEVICE

(75) Inventors: Hee Sun Shin, Paju (KR); Kum Mi Oh, Seoul (KR); Han Seok Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 278 days.

(21) Appl. No.: 13/222,326

(22) Filed: Aug. 31, 2011

(65) Prior Publication Data

US 2012/0133858 A1 May 31, 2012

(30) Foreign Application Priority Data

Nov. 25, 2010 (KR) .......................... 10-2010-0118262

(51) Int. Cl.
*G02F 1/1333* (2006.01)

(52) U.S. Cl.
USPC ............................................. 349/12; 345/174

(58) Field of Classification Search
None
See application file for complete search history.

(56) References Cited

U.S. PATENT DOCUMENTS

| | | |
|---|---|---|
| 2005/0128408 A1 | 6/2005 | Lee |
| 2005/0259190 A1 | 11/2005 | Wang et al. |
| 2006/0139546 A1 | 6/2006 | Lee |
| 2008/0078337 A1 | 4/2008 | Donnelly et al. |
| 2008/0136992 A1 | 6/2008 | Kim |
| 2009/0122247 A1* | 5/2009 | Chang ............................ 349/139 |
| 2010/0182273 A1 | 7/2010 | Noguchi et al. |
| 2011/0156165 A1 | 6/2011 | Jang et al. |
| 2011/0157039 A1* | 6/2011 | Shin et al. ...................... 345/173 |

FOREIGN PATENT DOCUMENTS

| | | |
|---|---|---|
| CN | 101158764 A | 4/2008 |
| CN | 101493594 A | 7/2009 |
| CN | 201293893 Y | 8/2009 |
| CN | 101630082 A | 1/2010 |
| CN | 101681221 A | 3/2010 |
| TW | 1254828 B | 5/2006 |
| TW | 1279766 B | 4/2007 |
| WO | 2010/002929 A2 | 1/2010 |
| WO | 2010/088670 A1 | 8/2010 |

OTHER PUBLICATIONS

UK Search Report dated Dec. 20, 2011 in counterpart UK patent application (citing references submitted in IDS of Feb. 23, 2012).
The First Office Action dated Jan. 24, 2014 from The State Intellectual Property Office of the People's Republic of China in Chinese counterpart application No. 201110359668.1.
Examination Statement dated Feb. 26, 2014 from the Taiwan Advance Patent & Trademark Office in Taiwanese counterpart application No. 100132645.

* cited by examiner

*Primary Examiner* — Thanh-Nhan P Nguyen
(74) *Attorney, Agent, or Firm* — Morgan, Lewis & Bockius LLP

(57) ABSTRACT

A liquid crystal display device includes a substrate; gate and data lines disposed on the substrate crossing each other to define a plurality of pixel regions; a plurality of pixel electrodes disposed in the pixel regions; a common electrode which is patterned to have common electrode pattern portions, each common electrode pattern portion corresponding to a respective pixel region; a plurality of sensing lines disposed on the common electrode and electrically connected with the common electrode; and at least one an electric field shield layer disposed over a region between adjacent common electrode pattern portions.

14 Claims, 7 Drawing Sheets

LIQUID CRYSTAL DISPLAY DEVICE

CROSS-REFERENCE TO RELATED APPLICATIONS

This application claims the benefit of the Korean Patent Application No. 10-2010-0118262 filed on Nov. 25, 2010, which is hereby incorporated by reference as if fully set forth herein.

BACKGROUND OF THE INVENTION

1. Field of the Invention

The present invention relates to a liquid crystal display (LCD) device, and more particularly, to an LCD device with a sensing electrode for sensing a user's touch.

2. Discussion of the Related Art

A liquid crystal display (LCD) device is widely applied in various fields, for example, notebook computers, monitors, spacecraft, and aircraft, due to advantageous properties such as low driving voltage, low power consumption, and portability. An LCD device includes a lower substrate, an upper substrate, and a liquid crystal layer disposed between the lower and upper substrates. According to whether or not an electric field is applied, an alignment of the liquid crystal layer is controlled so that light transmittance is controlled in the LCD device, thereby displaying images on the LCD device.

Typically, a mouse or keyboard is used as an input device for an LCD device. However, when the LCD device is applied to navigation systems, mobile terminals, and electric appliances, a touch screen is recently used as a new input means instead of using the mouse or keyboard, wherein the touch screen enables a user to directly input information with a finger or pen.

Hereinafter, a related art LCD device with a touch screen will be described in detail as follows. FIG. 1 is a cross section view illustrating a related art LCD device.

As shown in FIG. 1, the related art LCD device includes a liquid crystal panel 10 and a touch screen 20. The liquid crystal panel 10 displays images. Here, the liquid crystal panel 10 includes a lower substrate 12, an upper substrate 14, and a liquid crystal layer 16 formed between the lower and upper substrates 12 and 14. The touch screen 20 is formed on an upper surface of the liquid crystal panel 10, and the touch screen 20 is provided to sense a user's touch. The touch screen 20 includes a touch substrate 22, a first sensing electrode 24 formed on a lower surface of the touch substrate 22, and a second sensing electrode 26 formed on an upper surface of the touch substrate 22.

The first sensing electrode 24 is arranged in the horizontal direction on the lower surface of the touch substrate 22; and the second sensing electrode 26 is arranged in the vertical direction on the upper surface of the touch substrate 22. Thus, if the user touches a predetermined portion, capacitance between the first and second sensing electrodes 24 and 26 is changed at the touched portion. As such, the user's touching point is sensed by the change of the capacitance.

However, since the related art LCD device is formed with the touch screen 20 additionally formed on the upper surface of the liquid crystal panel 10, the entire thickness is increased due to the touch screen 20, the manufacturing process is complicated, and the manufacturing cost is also increased.

SUMMARY OF THE INVENTION

Accordingly, the present invention is directed to an LCD device that substantially obviates one or more problems due to limitations and disadvantages of the related art.

An object of the present invention is to provide an LCD device in which a sensing electrode for sensing a user's touch is provided inside a liquid crystal panel. Thus, it is not needed to provide an additional touch screen on an upper surface of the liquid crystal panel, thereby decreasing the entire thickness, simplifying the manufacturing process, and lowering the manufacturing cost.

Additional advantages and features of the invention will be set forth in part in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, a liquid crystal display device includes a substrate; gate and data lines disposed on the substrate crossing each other to define a plurality of pixel regions; a plurality of pixel electrodes disposed in the pixel regions; a common electrode which is patterned to have common electrode pattern portions, each common electrode pattern portion corresponding to a respective pixel region; a plurality of sensing lines disposed on the common electrode and electrically connected with the common electrode; and at least one an electric field shield layer disposed over a region between adjacent common electrode pattern portions.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. Hereinafter, an LCD device according to the present invention will be described with reference to the accompanying drawings.

Figure 1:
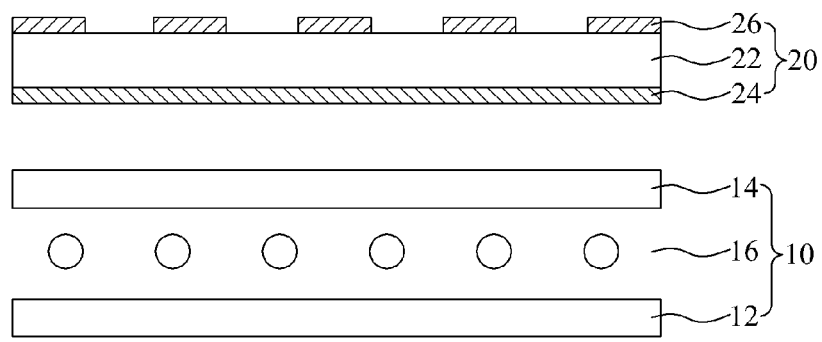
FIG. 1 is a cross sectional view illustrating a related art LCD device.
Figure 2A:
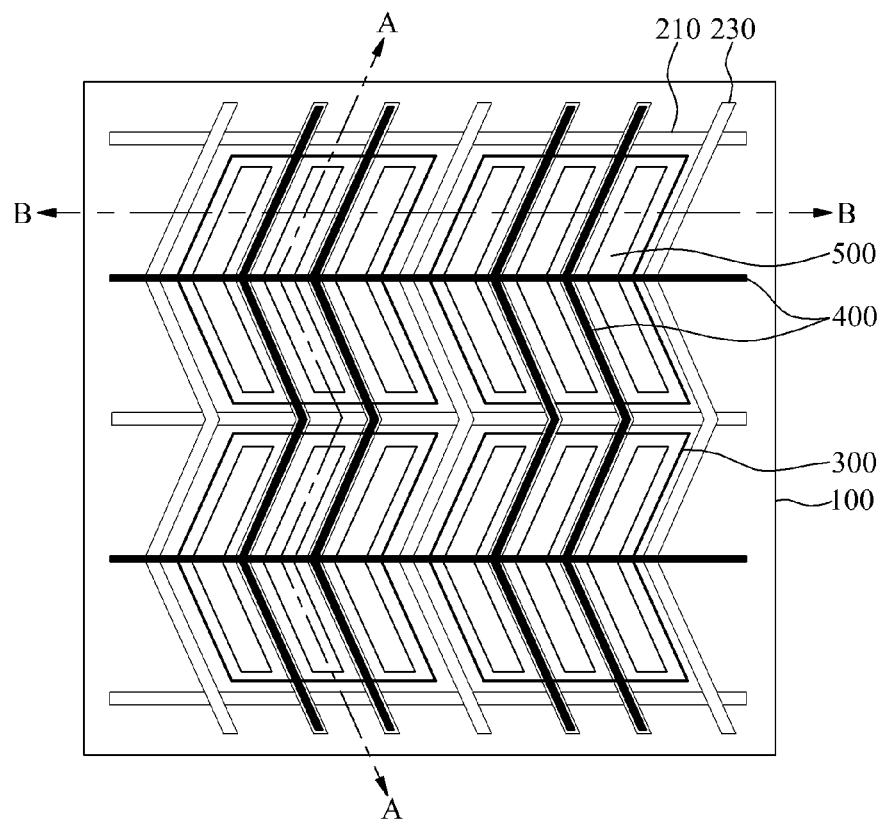
FIG. 2A is a plane view illustrating a lower substrate of an LCD device according to an exemplary embodiment of the present invention.
Figure 2B:
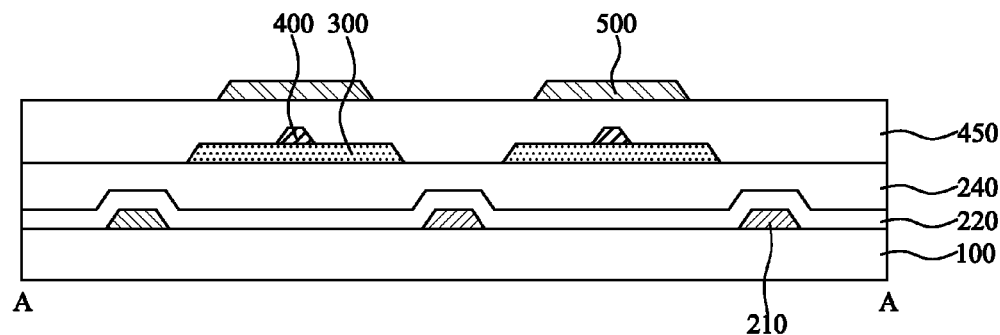
FIG. 2B is a cross sectional view along line A-A of FIG. 2A.
Figure 2C:
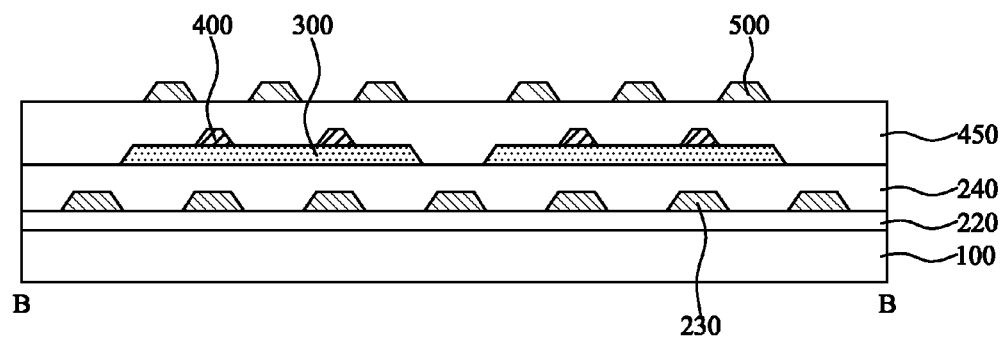
FIG. 2C is a cross sectional view along line B-B of FIG. 2A.

FIG. 2A is a plane view illustrating a lower substrate of an LCD device according to one embodiment of the present invention, FIG. 2B is a cross sectional view along line A-A of FIG. 2A, and FIG. 2C is a cross sectional view along line B-B of FIG. 2A. As shown in FIG. 2A, the LCD device according to an exemplary embodiment of the present invention includes a substrate 100, a gate line 210, a data line 230, a common electrode 300, a sensing line 400, and a pixel electrode 500. The substrate 100 may be formed of glass or transparent plastic. The gate line 210 is formed in the horizontal direction on the substrate 100; and the data line 230 is formed in the vertical direction on the substrate 100. A plurality of pixel regions are defined by the gate line 210 and the data line 230 crossing each other. The gate line 210 is provided in a straight-line shape, and the data line 230 is provided in a bent shape, but not limited to it. The data line 230 may be provided in a straight-line shape.

Although not shown, a thin film transistor is formed as a switching device for each of the pixel regions. The thin film transistor includes a gate electrode, a semiconductor layer, and source/drain electrodes. The thin film transistor may be formed in a bottom gate structure in which the gate electrode is positioned under the semiconductor layer, or a top gate structure in which the gate electrode is positioned above the semiconductor layer.

The common electrode 300 together with the pixel electrode 500 forms an electric field to drive liquid crystal. In addition, the common electrode 300 functions as a sensing electrode for sensing a user's touch. To use the common electrode 300 as the sensing electrode, the plural common electrodes 300 are provided in a predetermined pattern. Each of the plural common electrodes 300 may be formed in the size corresponding to one or more pixel regions. For example, as shown in the drawings, each common electrode 300 may be formed in the size corresponding to the three pixel regions.

The sensing line 400 electrically connects the plural common electrodes 300 with one another. That is, the individually-formed plural common electrodes 300 are connected with the sensing line 400, and a sensing circuit element is connected with an end of the sensing line 400, to thereby sense the user's touch. The sensing line 400 is arranged parallel to the data line 230 and also parallel to the gate line 210 to thereby sense the touched portion in the X-axis and Y-axis coordinates.

The sensing line 400 functions to reduce resistance of the common electrode 300 and to prevent disclination from occurring, which will be described as follows.

Typically, the common electrode 300 is formed of a transparent conductive material such as indium tin oxide (ITO). The transparent conductive material is disadvantageous in that it has the large resistance. In this respect, the sensing line 400 formed of a metal material with good conductivity is connected with the common electrode 300, whereby the resistance of the common electrode 300 is reduced.

As shown in FIG. 2A, if the data line 230 is formed in the bent shape, light leakage occurs in the bent portion of the data line 230, thereby causing disclination. Thus, the sensing line 400 arranged in parallel with the gate line 210 is formed in the disclination-occurring portion, to thereby prevent the disclination from occurring. The above sensing line 400 prevents the disclination from occurring. However, the decrease of aperture ratio caused by the sensing line 400 needs to be prevented. Thus, the sensing line 400 arranged parallel to the data line 230 is preferably overlapped with the data line 230. If needed, the sensing line 400 overlapped with the gate line 210 may be additionally provided to reduce the resistance of the common electrode 300 while preventing the decrease of transmittance.

The pixel electrode 500 is formed in each of the pixel regions. Especially, the shape of the pixel electrode 500 may correspond to the shape of the pixel region. As will be described with reference to FIG. 4A, at least one slit may be provided in the pixel electrode 500 to realize a fringe field switching mode LCD device.

The LCD device according to an exemplary embodiment of the present invention will be described in detail with reference to the cross section views of FIGS. 2B and 2C.

As shown in FIG. 2B, the gate line 210 is patterned on the substrate 100, and a gate insulating layer 220 and a passivation layer 240 are sequentially formed on the gate line 210. The common electrode 300 is patterned on the passivation layer 240, and the sensing line 400 is patterned on the common electrode 300. An insulating interlayer 450 is formed on the sensing line 400, and the pixel electrode 500 is patterned on the insulating interlayer 450.

As shown in FIG. 2C, the gate insulating layer 220 is formed on the substrate 100, the data line 230 is patterned on the gate insulating layer 220, and the passivation layer 240 is formed on the data line 230. The common electrode 300 is patterned on the passivation layer 240, and the sensing line 400 is patterned on the common electrode 300. The insulating interlayer 450 is formed on the sensing line 400, and the pixel electrode 500 is patterned on the insulating interlayer 450.

The cross section shown in FIGS. 2B and 2C illustrates the thin film transistor of the bottom gate structure. If forming the thin film transistor of the top gate structure, an insulating layer may be additionally formed under the gate line 210 to insulate the semiconductor layer and the gate line 210 from each other.

As shown in FIG. 2C, according to an exemplary embodiment of the present invention, the common electrode 300 is patterned such that the common electrode 300 corresponds to the plurality of pixel regions. Also, the respectively patterned common electrodes 300 are provided at fixed intervals while being positioned at the left and right sides with respect to the data line 230, i.e., the central data line 230 shown in FIG. 2C. Thus, there is a region where the common electrode 300 is formed above the data line 230, and a region where the common electrode 300 is not formed above the data line 230.

If the common electrode 300 is formed above the data line 230, the electric field occurring in the data line 230 is blocked by the common electrode 300 so that the liquid crystal layer is not influenced by the electric field occurring in the data line 230. However, if the common electrode 300 is not formed above the data line 230, since the electric field occurring in the data line 230 is not blocked by the common electrode 300, the liquid crystal layer is influenced by the electric field occurring in the data line 230, and crosstalk may occur.

Figure 3:
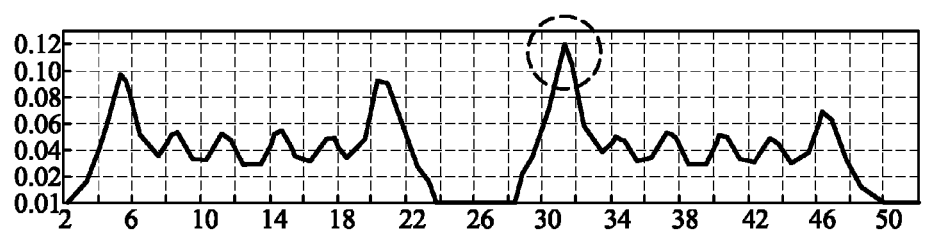
FIG. 3 is a simulation graph illustrating a distribution of electric field caused by a data line of an LCD device according to an exemplary embodiment of the present invention.

FIG. 3 is a simulation graph illustrating a distribution of electric field caused by the data line of the LCD device according to an exemplary embodiment of the present invention. As shown in FIG. 3, in the region where the common electrode 300 is not formed above the data line 230, the size of electric field is increased so that the crosstalk occurs therein. (See the circled portion of FIG. 3.)

Hereinafter, an LCD device according to another exemplary embodiment of the present invention will be described, wherein an electric field shield layer for preventing crosstalk is additionally formed over a data line of a lower substrate.

Figure 4A:
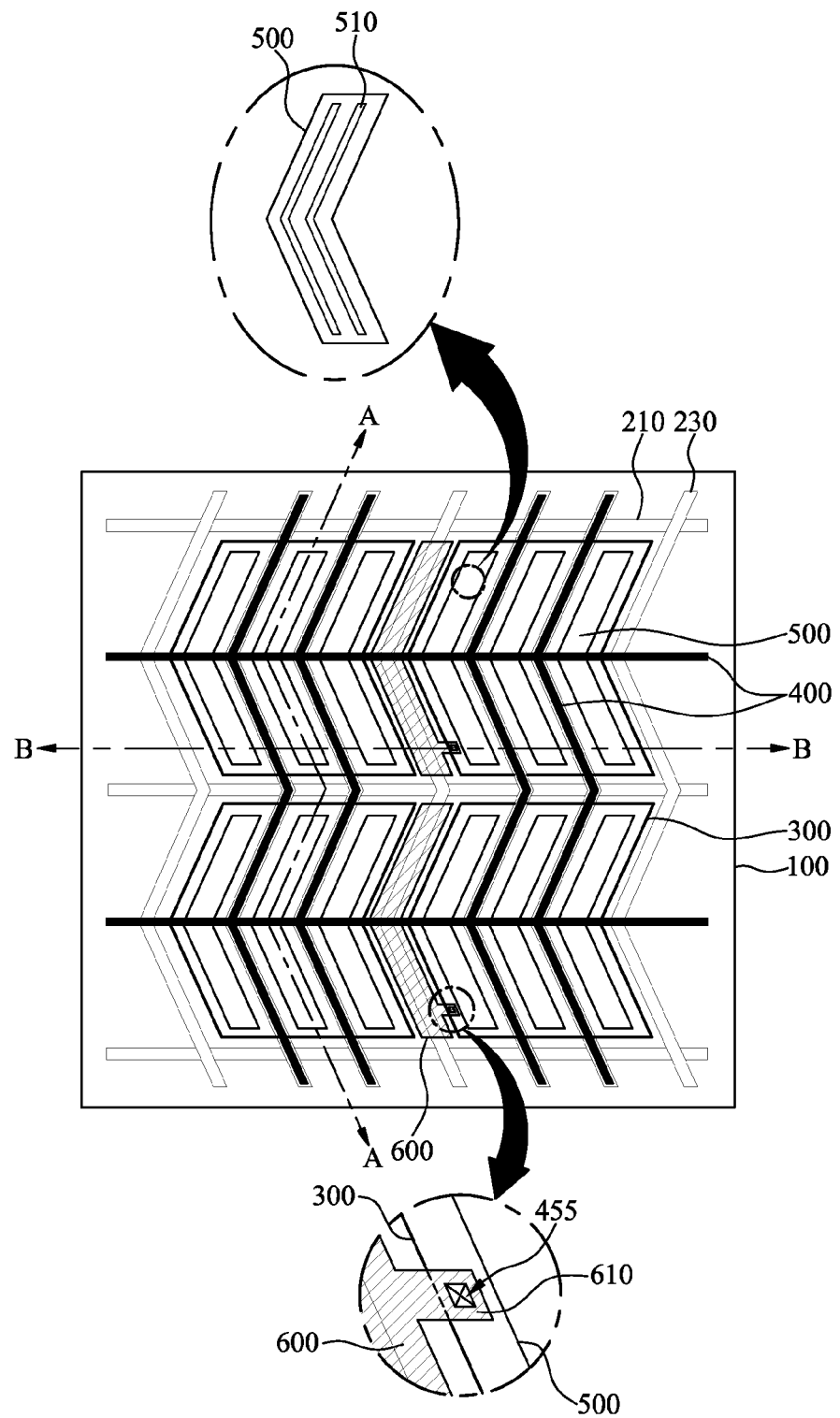
FIG. 4A is a plane view illustrating a lower substrate of an LCD device according to another exemplary embodiment of the present invention.
Figure 4B:
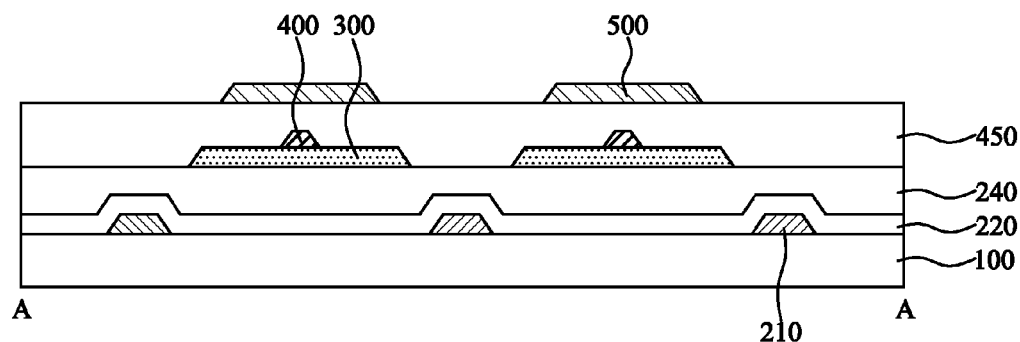
FIG. 4B is a cross sectional view along line A-A of FIG. 4A.
Figure 4C:
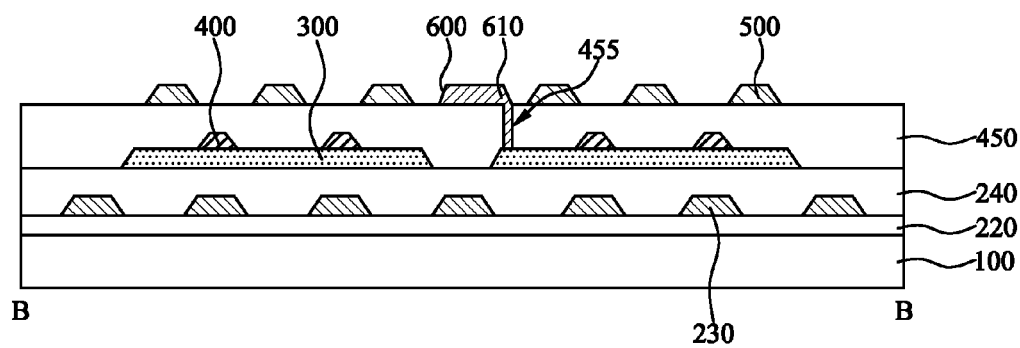
FIG. 4C is a cross sectional view along line B-B of FIG. 4A.

FIG. 4A is a plane view illustrating a lower substrate of an LCD device according to another embodiment of the present invention, FIG. 4B is a cross sectional view along line A-A of FIG. 4A, and FIG. 4C is a cross sectional view along line B-B of FIG. 4A. Except that an electric field shield layer 600 is additionally formed, the lower substrate of the LCD device according to another embodiment of the present is identical in structure to the lower substrate of the LCD device according to the aforementioned embodiment of the present invention. Thus, the same reference numbers will be used throughout the drawings to refer to the same or like parts, and a detailed explanation for the same parts will be omitted.

As shown in FIG. 4A, the LCD device according to another embodiment of the present invention includes a substrate 100, a gate line 210, a data line 230, a common electrode 300, a sensing line 400, a pixel electrode 500, and an electric field shield layer 600. A plurality of pixel regions are defined by the gate line 210 and the data line 230 crossing each other. At a crossing portion of the gate and data lines 210 and 230, a thin film transistor is formed as a switching device. The common electrode 300 is patterned at a size corresponding to one or more pixel regions. Also, the respectively patterned common electrodes 300 are provided at fixed intervals while being positioned at the left and right sides with respect to the data line 230. The sensing line 400 electrically connects the plurality of common electrodes 300 with one another, and is arranged parallel to the data line 230 and the gate line 210. Also, the sensing line 400 arranged parallel to the gate line 210 may be formed in the disclination-occurring region, and the sensing line 400 arranged in parallel with the data line 230 may be overlapped with the data line 230. The pixel electrode 500 may be provided in the pixel region, and formed in the shape corresponding to the pixel region.

At least one slit 510 may be provided in the pixel electrode 500. If the pixel electrode 500 includes the slit 510 therein, a fringe field is formed above the slit 510 between the pixel electrode 500 and the common electrode 300. As such, the liquid crystal is driven by the fringe field, thereby realizing a fringe field switching mode LCD device.

The electric field shield layer 600 is formed in a region where the common electrode 300 is not formed, that is, a region positioned between each common electrode 300. In more detail, the electric field shield layer 600 is formed above the data line 230 in the region where the common electrode 300 is not formed. Thus, the electric field occurring in the data line 230 is blocked by the electric field shield layer 600, thereby preventing the crosstalk occurrence.

The electric field shield layer 600 may be formed at the same layer as the pixel electrode 500, and may be formed of the same material as the pixel electrode 500, for example, ITO. In this case, when the electric field shield layer 600 is formed at the same layer as the pixel electrode 500 and formed of the same material as the pixel electrode 500, it is unnecessary to carry out an additional process for forming the electric field shield layer 600. The electric field shield layer 600 may be electrically connected with the common electrode 300. That is, the electric field shield layer 600 includes a contact portion 610 protruding toward the common electrode 300, wherein the contact portion 610 is connected with the common electrode 300 via a contact hole 455.

In the drawings, the contact portion 610 protrudes rightward so that the contact portion 610 is connected with the common electrode 300 formed at the right side with respect to the data line 230. However, the contact portion 610 may protrude leftward so that the contact portion 610 is connected with the common electrode 300 formed at the left side with respect to the data line 230.

The contact portion 610 is formed in a non-transmission region to prevent the aperture ratio from being lowered by the contact portion 610. That is, the contact portion 610 is formed in a thin film transistor region (not shown), or formed corresponding to a light-shielding layer region, such as a black matrix region, on an upper substrate.

Hereinafter, an LCD device according to another exemplary embodiment of the present invention will be described with reference to cross sectional views of FIGS. 4B and 4C.

As shown in FIG. 4B, a gate line 210 is patterned on a substrate 100, and a gate insulating layer 220 and a passivation layer 240 are sequentially formed on the gate line 210. A common electrode 300 is patterned on the passivation layer 240, and a sensing line 400 is patterned on the common electrode 300. An insulating interlayer 450 is formed on the sensing line 400, and a pixel electrode 500 is patterned on the insulating interlayer 450.

As shown in FIG. 4C, the gate insulating layer 220 is formed on the substrate 100; a data line 230 is patterned on the gate insulating layer 220; and the passivation layer 240 is formed on the data line 230. The common electrode 300 is patterned on the passivation layer 240, and the sensing line 400 is patterned on the common electrode 300. The insulating interlayer 450 is formed on the sensing line 400, and the pixel electrode 500 and an electric field shield layer 600 are patterned on the insulating interlayer 450. The electric field shield layer 600 includes a contact portion 610 extending toward the common electrode 300, wherein the contact portion 610 is connected with the common electrode 300 via a contact hole 455 provided in the insulating interlayer 450.

Figure 5:
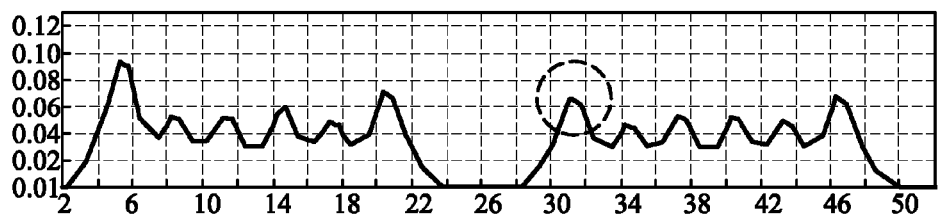
FIG. 5 is a simulation graph illustrating a distribution of electric field caused by a data line of an LCD device according to another exemplary embodiment of the present invention.

FIG. 5 is a simulation graph illustrating a distribution of electric field caused by the data line of the LCD device according to another embodiment of the present invention. As shown in FIG. 5, when the electric field shield layer 600 is formed above the data line, the size of electric field is not increased (see the circled portion) so that crosstalk is prevented.

Figure 6:
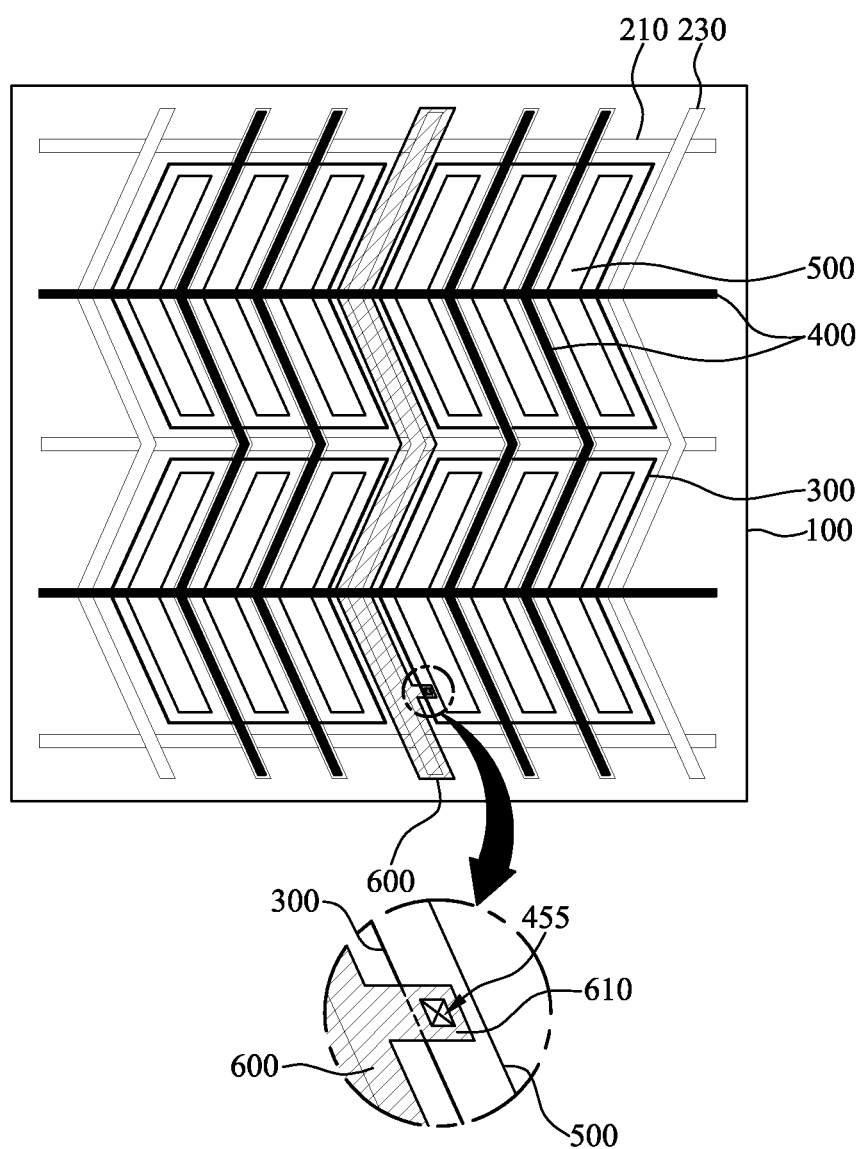
FIG. 6 is a plane view illustrating a lower substrate of an LCD device according to another exemplary embodiment of the present invention.

FIG. 6 is a plane view illustrating a lower substrate of an LCD device according to another exemplary embodiment of the present invention. Except a structure of electric field shield layer 600, the lower substrate of the LCD device shown in FIG. 6 is identical to the lower substrate of the LCD device shown in FIGS. 4A-4C. Thus, the same reference numbers will be used throughout the drawings to refer to the same or like parts, and a detailed explanation for the same parts will be omitted.

In FIGS. 4A-4C, the electric field shield layer 600 is not continuously formed above the data line 230 in the region where the common electrode 300 is not formed. That is, the electric field shield layer 600 is patterned while being not overlapped with the gate line 210. In FIG. 6, the electric field shield layer 600 is continuously formed above the data line 230 in the region where the common electrode 300 is not formed. That is, the electric field shield layer 600 is patterned while being overlapped with the gate line 210.

Also, in FIGS. 4A-4C, since the electric field shield layer 600 is not continuously formed, each electric field shield layer 600 is provided with the contact portion 610 protruding toward the common electrode 300. However, in FIG. 6, since the electric field shield layer 600 is continuously formed, the electric field shield layer 600 may be provided with only one contact portion 610 protruding toward the common electrode 300. Selectively, the electric field shield layer 600 may be provided with the plural contact portions.

Figure 7A:
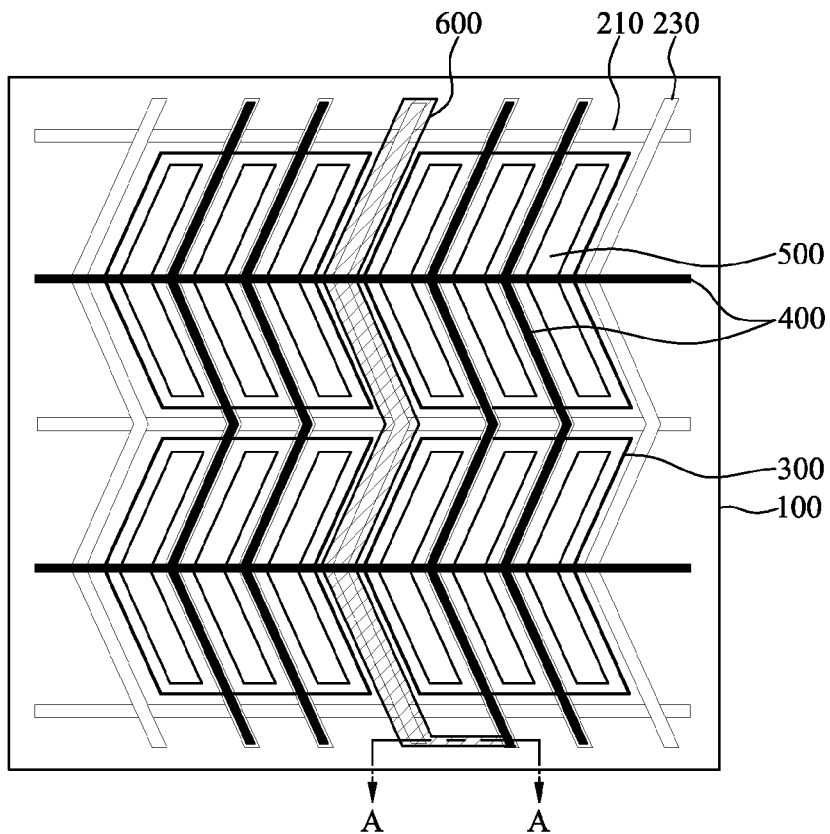
FIG. 7A is a plane view illustrating a lower substrate of an LCD device according to another embodiment of the present invention.
Figure 7B:
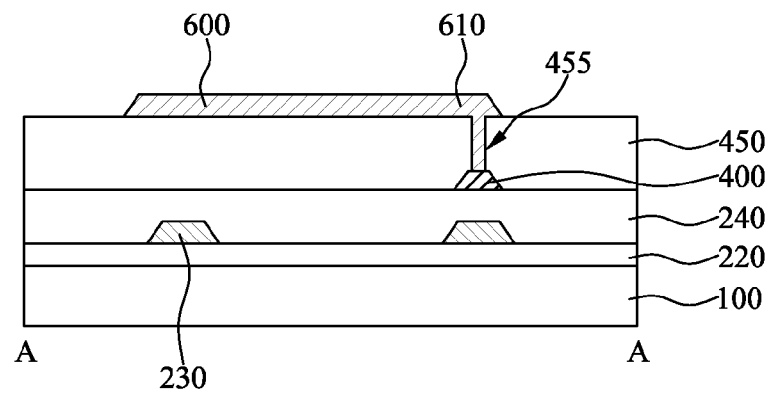
FIG. 7B is a cross sectional view along line A-A of FIG. 7A.

FIG. 7A is a plane view illustrating a lower substrate of an LCD device according to another exemplary embodiment of the present invention, and FIG. 7B is a cross section view along line A-A of FIG. 7A. Except that an electrical connection is changed between the electric field shield layer 600 and the common electrode 300, the lower substrate of the LCD device shown in FIGS. 7A-7B is identical to the above lower substrate of the LCD device shown in FIG. 6. Thus, the same reference numbers will be used throughout the drawings to refer to the same or like parts, and a detailed explanation for the same parts will be omitted.

As shown in FIG. 6, the contact portion 610 is provided in the electric field shield layer 600, and the contact portion 610 is connected with the common electrode 30 via the contact hole 455. However, in FIGS. 7A-7B, the electric field shield layer 600 is connected with the sensing line 400 in the periphery of active region, whereby the electric field shield layer 600 is electrically connected with the common electrode 300.

In more detail, as shown in FIGS. 7A and 7B, the contact portion 610 protrudes from one end of the electric field shield layer 600 toward the sensing line 400. The contact portion 610 is connected with the sensing line 400 via the contact hole 455 of the insulating interlayer 450. The sensing line 400 is connected with the common electrode 300 in the active region. Accordingly, the electric field shield layer 600 is electrically connected with the common electrode 300 via the sensing line 400. Meanwhile, when the common electrode 300 and sensing line 400 are patterned by an exposure process using a halftone mask, the common electrode 300 is additionally formed under the sensing line 400 in FIG. 7B.

Figure 8:
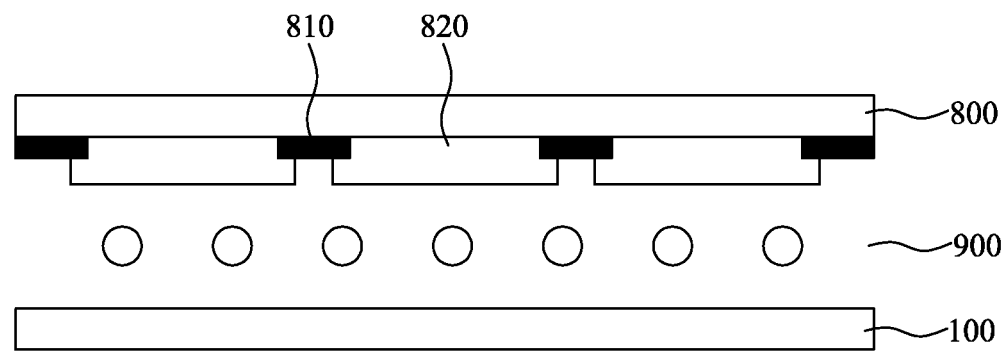
FIG. 8 is a liquid crystal display device according to the present invention.

For the above description of the LCD device according to the present invention, the lower substrate has been explained. FIG. 8 shows a completed a liquid crystal display device according to the present invention. In the completed liquid crystal device, the lower substrate 100 is joined with an upper substrate 800 with a liquid crystal layer 900 therebetween. The upper substrate 800 may include a light-shielding layer 810, such as a black matrix layer, to prevent light leakage in other regions except the pixel region; red (R), green (G), and blue (B) color filter layers 820 respectively formed between each light-shielding layer; and an overcoat layer which is formed on the color filter layers.

As above explained, the common electrode is used for forming the electric field to drive the liquid crystal, and furthermore used as the sensing electrode for sensing the user's touch. Unlike the related art, it is unnecessary for the LCD device according to the present invention to provide additional touch screen on the liquid crystal panel, whereby the LCD device according to the present invention has decreased the thickness, and realizes a simplified manufacturing process and decreased manufacturing cost.

Also, the electric field shield layer is formed in the region between the common electrodes so that it is possible to prevent the liquid crystal from being influenced by the electric field occurring in the data line, thereby overcoming the problem of crosstalk.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An LCD device, comprising:
a substrate;
gate and data lines disposed on the substrate crossing each other to define a plurality of pixel regions;
a plurality of pixel electrodes disposed in the pixel regions;
a common electrode which is patterned to have common electrode pattern portions, each common electrode pattern portion corresponding to a respective pixel region;
a plurality of sensing lines disposed on the common electrode and electrically connected with the common electrode; and
at least one electric field shield layer disposed over a region between adjacent common electrode pattern portions.

2. The LCD device according to claim 1, wherein the electric field shield layer is disposed above the data line over at least a region where the common electrode is absent.

3. The LCD device according to claim 1, wherein the electric field shield layer is disposed on the same layer as the pixel electrode, and is formed of the same material as the pixel electrode.

4. The LCD device according to claim 1, wherein the electric field shield layer is electrically connected with a respective common electrode pattern portion.

5. The LCD device according to claim 4, wherein the electric field shield layer includes a contact portion protruding toward the respective common electrode pattern portion, and wherein the contact portion is connected with the common electrode pattern portion via a contact hole.

6. The LCD device according to claim 5, wherein the contact portion is formed in a non-transmission region to prevent the decrease of aperture ratio.

7. The LCD device according to claim 6, wherein the non-transmission region correspond to a black matrix region or thin film transistor region.

8. The LCD device according to claim 1, wherein the electric field shield layer is overlapped with the gate line.

9. The LCD device according to claim 8, wherein the electric field shield layer is continuous between at least two pixel region.

10. The LCD device according to claim 1, wherein the electric field shield layer includes a contact portion protruding toward a respective sensing line, and the contact portion is connected with the sensing line via a contact hole.

11. The LCD device according to claim 1, wherein the pixel electrode is formed over the common electrode with an insulating interlayer disposed between the pixel electrode and the common electrode.

12. The LCD device of claim 1, wherein the common electrode pattern portions each have a bent shape, and wherein the first sensing line is disposed at the bent portion of the common electrode pattern portions to prevent disclination.

13. The LCD device of claim 1, wherein the common electrode forms an electric field together with the pixel electrode.

14. The LCD device of claim 1, wherein the sensing lines sense a position of a user's touch.

* * * * *